US012634690B2

(12) United States Patent
Gundavelli et al.

(10) Patent No.: US 12,634,690 B2
(45) Date of Patent: May 19, 2026

(54) SYSTEMS AND METHODS FOR MULTI-CLOUD CELLULAR SERVICE AUTHENTICATION

(71) Applicant: CISCO TECHNOLOGY, INC., San Jose, CA (US)

(72) Inventors: Sri Gundavelli, San Jose, CA (US); Timothy P. Stammers, Raleigh, NC (US); Ravi Kiran Guntupalli, Cumming, GA (US); Vimal Srivastava, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 284 days.

(21) Appl. No.: 17/934,422

(22) Filed: Sep. 22, 2022

(65) Prior Publication Data

US 2024/0107307 A1     Mar. 28, 2024

(51) Int. Cl.
*H04W 12/06* (2021.01)
*H04L 9/40* (2022.01)

(52) U.S. Cl.
CPC ....... *H04W 12/068* (2021.01); *H04L 63/0846* (2013.01); *H04L 63/20* (2013.01)

(58) Field of Classification Search
CPC .. H04W 12/068; H04L 63/0846; H04L 63/20; H04L 63/08
See application file for complete search history.

(56) References Cited

U.S. PATENT DOCUMENTS

| | | | | |
|---|---|---|---|---|
| 9,300,646 B1* | 3/2016 | Saylor | .................. | H04W 4/029 |
| 2014/0181948 A1* | 6/2014 | Mazur | ..................... | G06F 21/31 |
| | | | | 726/9 |
| 2016/0066183 A1* | 3/2016 | Conant | .............. | H04L 63/0853 |
| | | | | 726/6 |
| 2018/0331886 A1* | 11/2018 | Schroeder | .............. | H04L 69/40 |
| 2021/0153019 A1 | 5/2021 | Bachmutsky et al. | | |
| 2021/0282012 A1 | 9/2021 | Lee et al. | | |
| 2021/0314314 A1* | 10/2021 | Caldwell | ................. | H04L 63/10 |
| 2021/0392131 A1 | 12/2021 | Svede et al. | | |
| 2021/0392142 A1* | 12/2021 | Stephens | ............... | H04L 63/104 |
| 2022/0060893 A1 | 2/2022 | Gundavelli et al. | | |
| 2022/0141643 A1 | 5/2022 | Balasubramanian et al. | | |
| 2022/0276312 A1* | 9/2022 | Kim | ..................... | G01R 31/396 |
| 2022/0353065 A1* | 11/2022 | Beredimas | .............. | G06F 21/44 |
| 2023/0135134 A1* | 5/2023 | Valkaitis | ............. | H04L 63/0236 |
| | | | | 726/11 |
| 2023/0232221 A1* | 7/2023 | Rajadurai | ........... | H04W 12/043 |
| | | | | 726/6 |

* cited by examiner

*Primary Examiner* — Joe Chacko
(74) *Attorney, Agent, or Firm* — Polsinelli P.C.

(57) ABSTRACT

Disclosed herein are systems, methods, and computer-readable media for authentication in a multi-cloud cellular service. In one aspect, a method includes receiving, at a controller of a local site within the multi-cloud cellular service, a network connection request from a device, the cloud-based authentication component being a central network component configured to store device credentials and network policies for authenticating devices connecting to the multi-cloud cellular service across all sites associated with the multi-cloud cellular service. In one aspect, the method also includes locally authenticating, by the controller, the device using stored credential information obtained from the cloud-based authentication component prior to losing the connectivity to the cloud-based authentication component.

20 Claims, 11 Drawing Sheets

SYSTEMS AND METHODS FOR MULTI-CLOUD CELLULAR SERVICE AUTHENTICATION

TECHNICAL FIELD

The subject matter of this disclosure relates in general to the field of computer networking, and more particularly, to authentication and onboarding of devices in a multi-cloud fifth-generation (5G) cellular service deployment.

BACKGROUND

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Current mobile and wireless communication systems have widely adopted a next-generation wireless communication system, 5G that provides much higher data rates and lower latency. With the 5G evolution, a concept known as Private 5G (P5G) has been introduced. P5G uses 5G-enabled technologies (e.g., 3GPP access), but allows the owner to provide priority access or licensing for its wireless spectrum or dedicated bandwidth. As follows, an enterprise can be provided with an isolated 5G network, which can be dedicated to the enterprise for its specific use cases.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
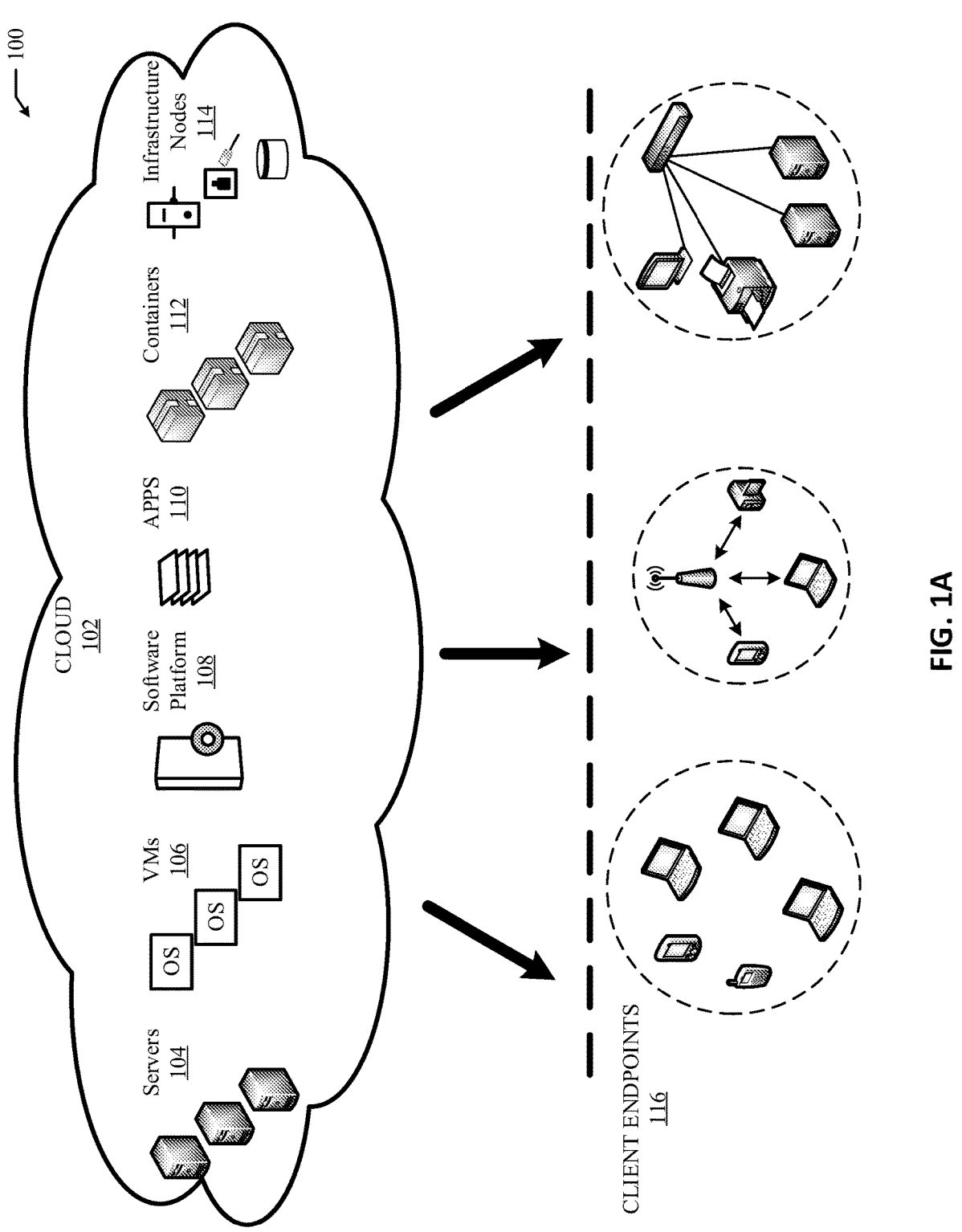
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to techniques for local management of credentials of devices connecting to a multi-site 5G network in order to address instances where a local site incurs a loss of connection to a cloud-based credential management component of the multi-site 5G architecture.

In one aspect, an authentication method in a multi-cloud cellular service includes receiving, at a controller of a local site within the multi-cloud cellular service, a network connection request from a device, wherein the local site does not have connectivity to a cloud-based authentication component for authenticating the device, the cloud-based authentication component being a central network component configured to store device credentials and network policies for authenticating devices connecting to the multi-cloud cellular service across all sites associated with the multi-cloud cellular service; and locally authenticating, by the controller \, the device using stored credential information obtained from the cloud-based authentication component prior to losing the connectivity to the cloud-based authentication component.

In another aspect, the stored credential information has a corresponding Time To Live (TTL) value, which when expires, can not be used to locally authenticate the device.

In another aspect, locally authenticating the device includes rejecting the device if the TTL vale of the credential information is expired.

In another aspect, the method further includes refreshing a local cache at the local site with updated credential information for the device upon re-establishing connectivity to the cloud-based authentication component.

In another aspect, the stored credential information is a subset of the device credentials and network policies stored at the cloud-based authentication component that are relevant to the local site.

In another aspect, the method further includes receiving the credential information from the cloud-based authentication component prior to losing connectivity to the cloud-based authentication component.

In another aspect, the cloud-based authentication component performs a cite policy check to determine relevance of the credential information to the local site prior to sending the credential information to be stored at the local site.

In another aspect, the method further includes updating a local cache in which the credential information is stored when security or policy updates are made at the cloud-based authentication component while the local site has connectivity to the cloud-based authentication component.

In one aspect, a controller of a local site within the multi-cloud cellular service is configured to authenticate devices for connecting to the multi-cloud cellular service. The controller includes one or more memories having computer-readable instructions and one or more processors. The one or more processors are configured to execute the computer-readable instructions to receive a network connection request from a device, wherein the local site does not have connectivity to a cloud-based authentication component for authenticating the device, the cloud-based authentication component being a central network component configured to store device credentials and network policies for authenticating devices connecting to the multi-cloud cellular service across all sites associated with the multi-cloud cellular service; and locally authenticate the device using stored credential information obtained from the cloud-based authentication component prior to losing the connectivity to the cloud-based authentication component.

In one aspect, one or more non-transitory computer-readable media include computer-readable instructions, which when executed by one or more processors at a controller of a local site within the multi-cloud cellular service, causes the controller to receive a network connection request from a device, wherein the local site does not have connectivity to a cloud-based authentication component for authenticating the device, the cloud-based authentication component being a central network component configured to store device credentials and network policies for authenticating devices connecting to the multi-cloud cellular service across all sites associated with the multi-cloud cellular service; and locally authenticate the device using stored credential information obtained from the cloud-based authentication component prior to losing the connectivity to the cloud-based authentication component.

DESCRIPTION OF EXAMPLE EMBODIMENTS

The following acronyms are used throughout the present disclosure, provided below for convenience.

5GaaS: Fifth-Generation Application as a Service
AAA: Authentication Authorization Accounting
AF: Application Function
AMF: Access and Mobility Management Function
AUSFs: Authentication Server Functions
CGW: Converged Gateway
CHF: Charging Function
DaaS: Desktop as a Service
IaaS: Infrastructure as a Service
ITaaS: Information Technology Management as a Service
MBR: Modify Bearer Request
MBaaS: Mobile Backend as a Service
MME: Mobility Management Entity
MSaaS: Managed Software as a Service
NAS: Non-Access Stratum
NEFs: Network Exposure Functions
NRFs: NF Repository Functions
NSSFs: Network Slice Selection Functions
OCS: Online charging system
PaaS: Platform as a Service
PCF: Policy Control Function
PCRF: Policy and Charging Rules Function
PGW: Packet Data Network (PDN) Gateway
PLMN: Public Land Mobile Network
SaaS: Software as a Service
SCEF: Service Capability Exposure Function
SGW: Serving Gateway
SMF: Session Management Function
SPGW: Serving/PDN Gateway
TAU: Tracking Area Update
UDM: Unified Data Manager Function
UE: User Equipment
UPF: User Plane Function Enterprise networks require high availability, particularly in instances when private 5G solutions are offered. For instance, the use cases require greater than 99.99% availability including ability to connect new devices. This is particularly noteworthy for industrial automation applications but in general applicable to various private 5G deployments.

In a typical 5GaaS deployment, the RAN, Core Network (Control Plane and User Plane functions) are located in the enterprise on-premises components (e.g., on-premises 5GC etc.), whereas the authentication function along with the credential database is located in the cloud. This allows for easier onboarding of customer profiles and policy management but also allows for multiple locations of same enterprise receiving seamless service as devices could potentially migrate/move around.

As part of the customer on-boarding process, enterprise device credentials and policies are populated into the cloud database. Any time a device is connected to the on-site 5G network, the on-premises 5GC element may communicate (interface) with the cloud-based authentication function component for obtaining the authentication vectors. As an entity may potentially have hundreds of sites, hosting credential databases in every site and performing the lifecycle management becomes an operational nightmare if not impossible. Therefore, the approach of centralizing the authentication function and keeping the credential store in the cloud has been developed.

This approach of central management of credentials works as long as there is network connectivity between site components and the cloud. However, any time a site loses connectivity to the cloud, the on-premises 5G network comes to a halt, no new devices can be authenticated to the network, and local communications within a given site are impacted. Taking a factory floor as an example, the loss of connectivity (e.g., WAN connectivity) should ideally not impact the local operations, however reliance on cloud authentication function will result in the disruption of the on-premises 5G services.

Therefore, there exists a need for credential management in a multi-site 5G deployment, that eliminates the need for replicating the credential database in potentially hundreds of sites and requiring lifecycle management of all these replicated credential databases.

Prior to describing techniques for local management of credentials, one or more examples of enterprise networks/cloud computing infrastructures and 5G networks will be described with reference to FIGS. 1A-B and 2.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure or a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g., through an LTE S14 interface, to alert the client endpoint of Wi-Fi availability through the Wi-Fi infrastructure. In another example, the cloud service can use the Wi-Fi infrastructure, e.g., through MBO Wi-Fi messaging, to alert the client endpoint of LTE availability through the LTE infrastructure.

Figure 1B:
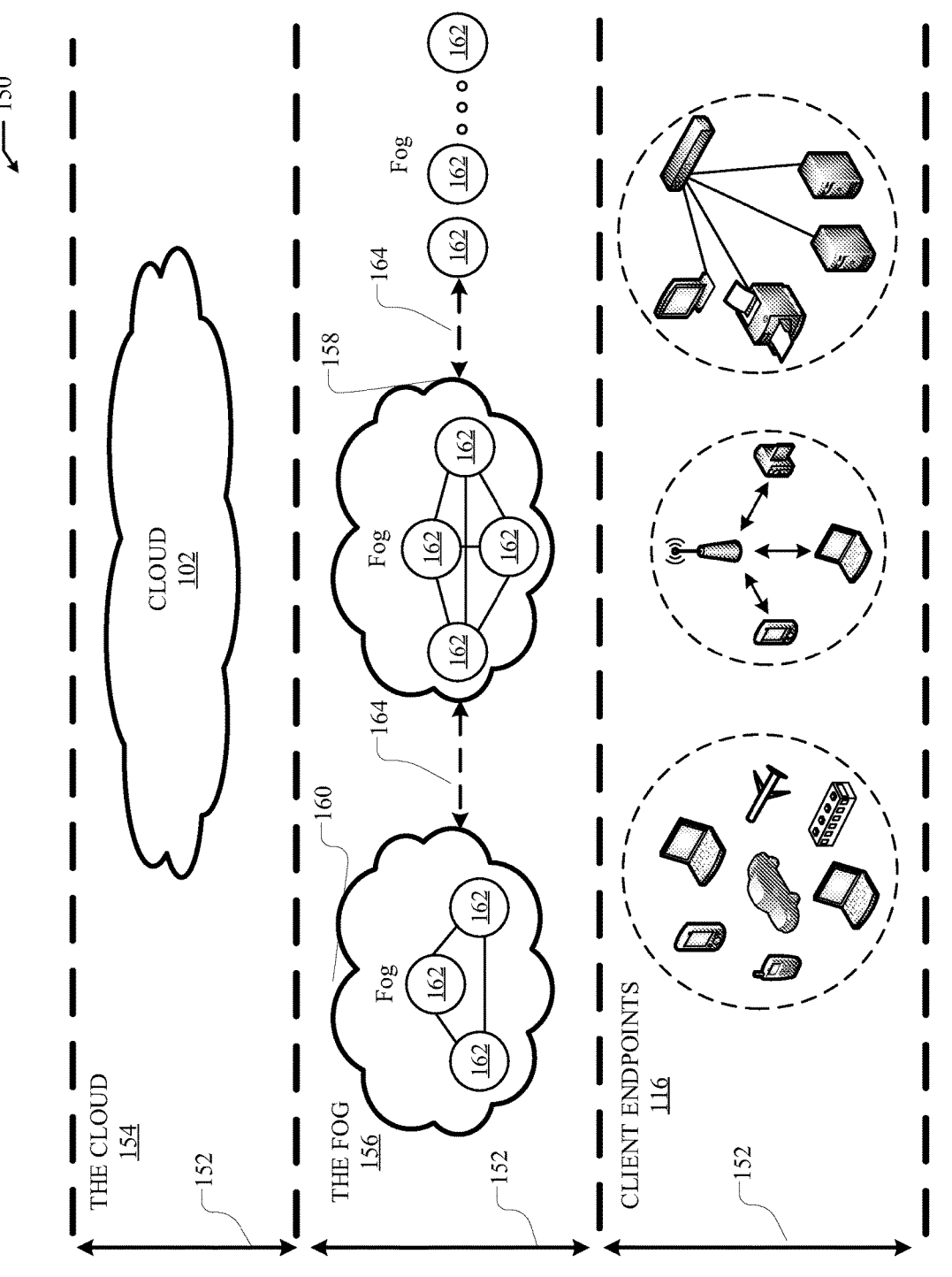
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as a train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
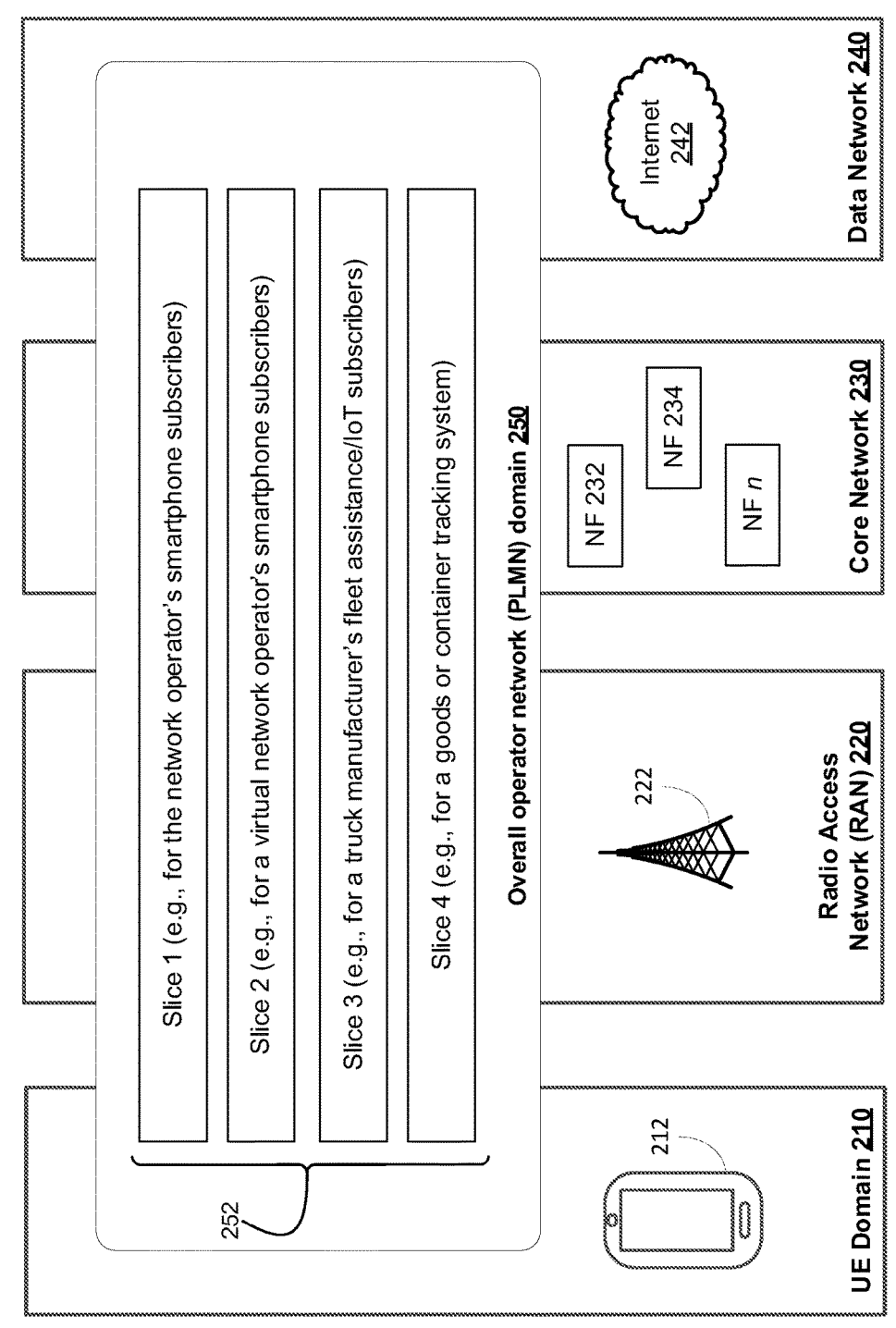
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g., to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF); typically used when core network 230 is a 5GC network) and Mobility Management Entities (MME); typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN) and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer need.

Figure 3:
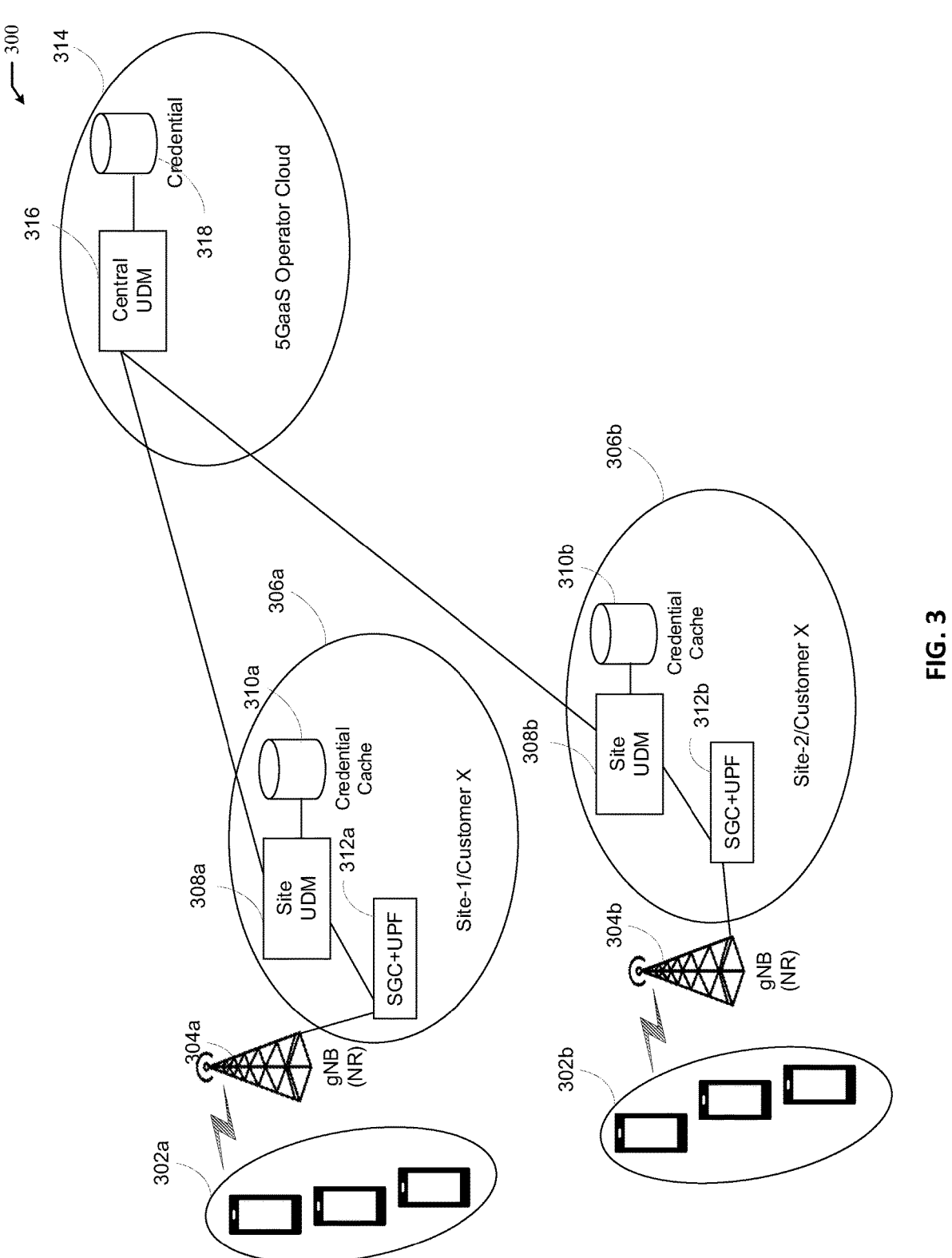
FIG. 3 illustrates an example 5G network environment for credential management, in which one or more aspects of the present disclosure may operate.

FIG. 3 illustrates an example 5G network environment for credential management, in which one or more aspects of the present disclosure may operate. More specifically, FIG. 3 illustrates a system 300 in a 5G network environment that can facilitate the onboarding of one or more devices to a site via a site policy which includes a list of devices to be onboarded (e.g., connected to the 5G network at the local site 306a or 306b). The system 300 can include user equipment(s) (UEs) 302a and 302b, Next Generation Node Bs (gNB) 304a and 304b communicatively coupled to local sites 306a and 306b, respectively. Each of local sites 306a and 306b may include a site UDM such as one of UDMs 308a and 308b, a credential cache such as one of credential caches 310a and 310b, and a 5GC and UPF component such as one of 5GC+UPF components 312a and 312b. Each of the local sites 306a and 306b may also be referred to as local network 306a or local network 306b. While not shown in FIG. 3, each of local sites 306a and 306b may include additional known or to be developed elements and/or functionalities for providing network connectivity to end devices connected thereto. The system 300 may also include a cloud based fifth-generation application as a service (5GaaS) component 314 communicatively coupled to each of local sites 306a and 306b. The cloud based 5GaaS component 314 may provide various network connectivity functionalities and coordinate operations of multiple 5G sites such as local sites 306a and 306b connected thereto.

In one example, one or more of UEs 302a may be present in the footprint of local site 306a and may attempt to connect to the network at local site 306a (via gNB 304a). Similarly, one or more of UEs 302a may be present in the footprint of local site 306b and may attempt to connect to network at local site 306b (via gNB 304b).

Each of UEs 302a and 302b may be authenticated before connecting to the corresponding one of local sites 306a and 306b. Through the use of a central management plane, credentials for authorizing a corresponding one of UEs 302a and 302b to connect to the corresponding one of local sites 306a and 306b may be obtained. Each of the local sites 306a and 306b may include a Unified Data Manager Function (UDM) 308a or 308b. Each of UDMs 308a and 308b may generate 3GPP 5G AKA Authentication Vectors, and provide User Identification Handling, including storage and management of user subscriptions for each subscriber (each of UEs 302a or 302b) associated with the 5G system of that particular site.

Each local site 306a and 306b may be configured to be connected to the 5GaaS component 314, where the credentials for each authorized device associated with each site is stored. The 5GaaS component 314 can include a central UDM 316 and a credential cache 318. The central UDM 316 can operate as a central location where all device credentials and/or network connectivity policies are stored. Each of local site UDMs 308a and 308b may then request device credentials associated with the UEs attempting to connect to the corresponding local site, from UDM 316. Accordingly, for onboarding at a local site 306a or 306b, the device credentials, associated with a UE 302a or 302b, may be obtained from the central UDM 316, and transmitted to the local site 306a and/or 306b to be stored in the local site's credential cache 310a or 310b. This transmission may be made over user plane function (UPF) 312. The stored credentials retrieved from the central UDM 316 can then be used to complete device authentication to connect to the local site 306a and/or 306b.

Figure 4A:
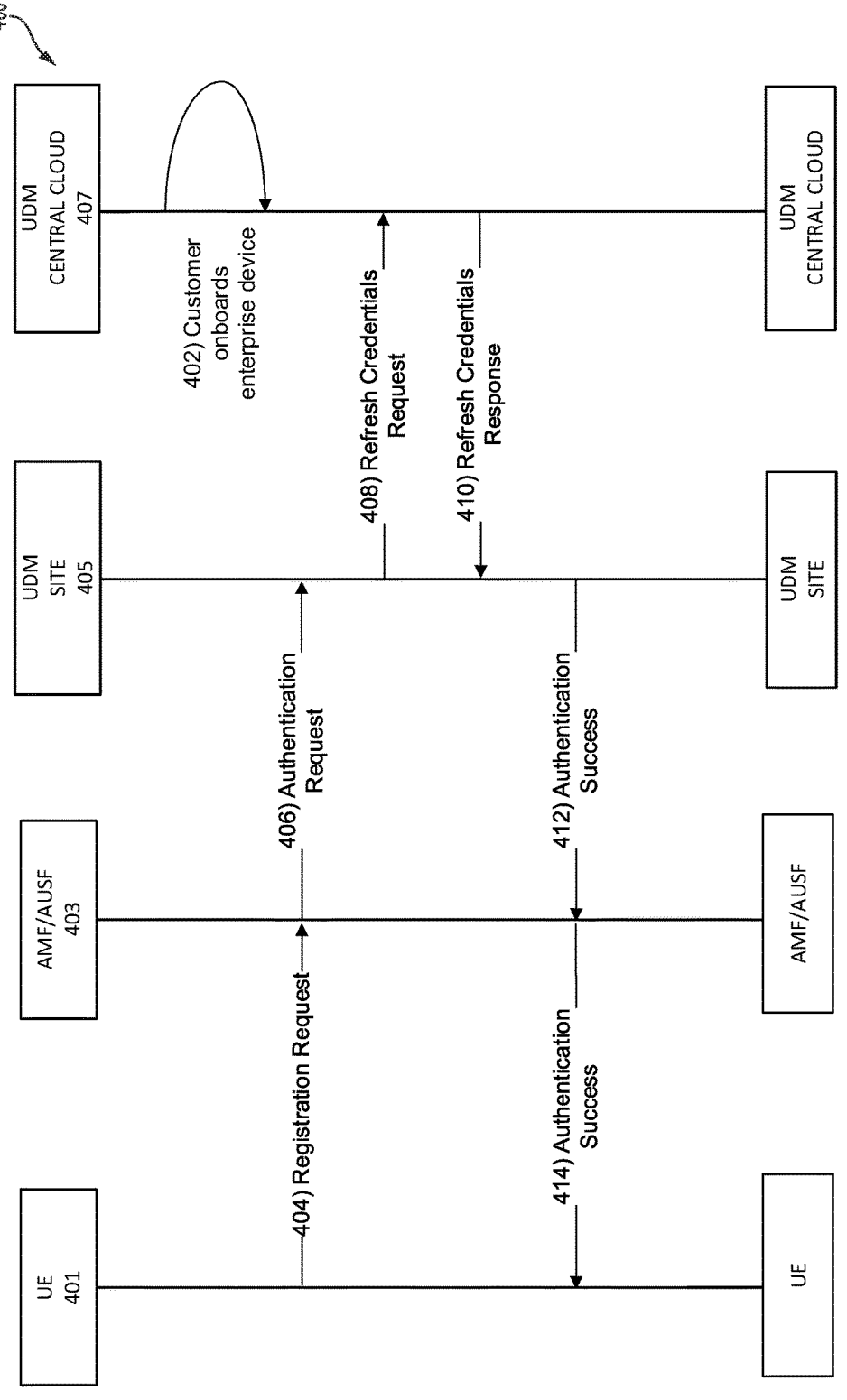
FIG. 4A-4C illustrates example communication diagrams for a process of interworking between a cloud authentication function and a site authentication function, according to some aspects of the present disclosure.
Figure 4B:
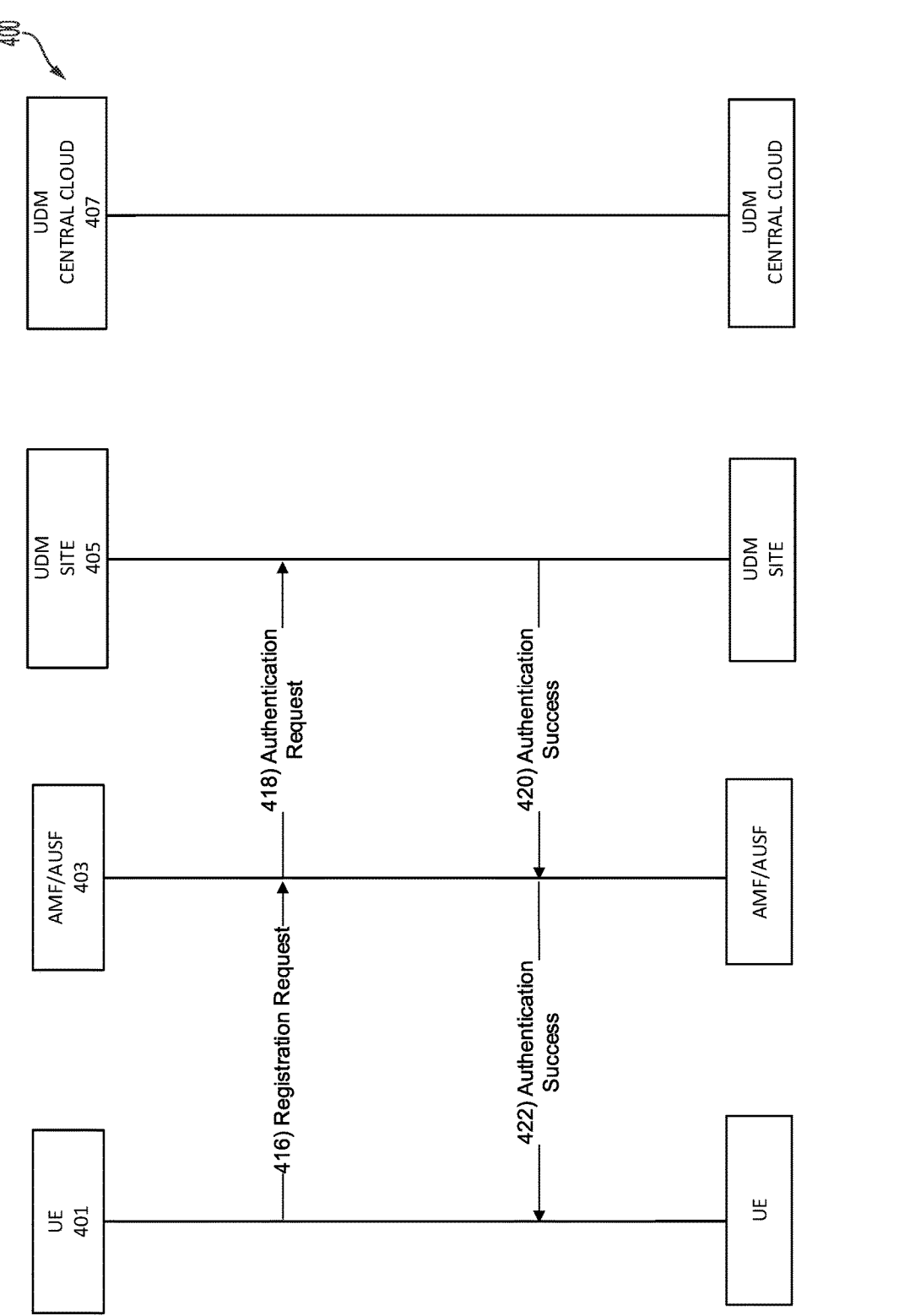
Figure 4C:
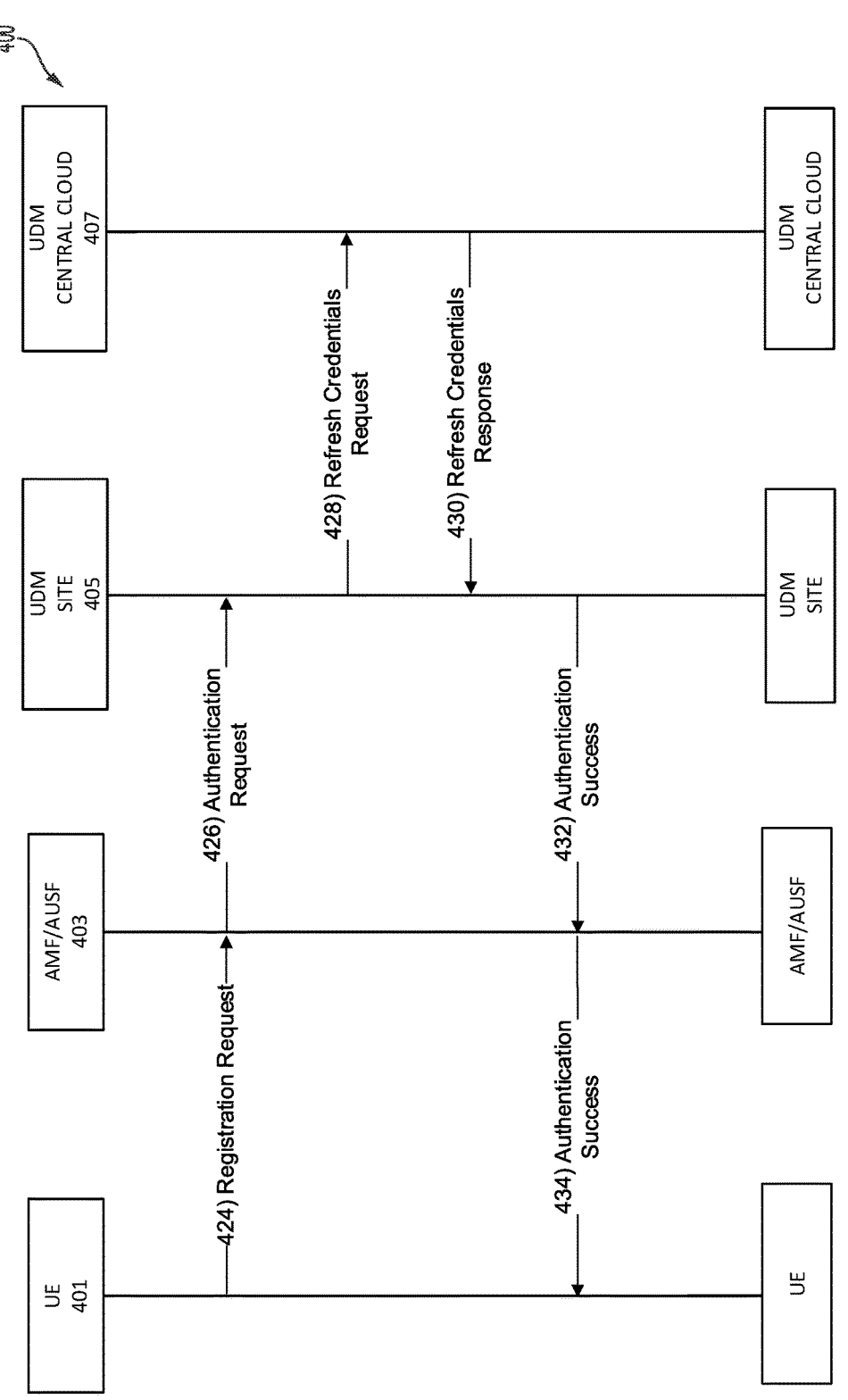

FIG. 4A-4C illustrates example communication diagrams for a process of interworking between a cloud authentication function and a site authentication function, according to some aspects of the present disclosure. The interworking between the cloud authentication function and the site authentication function can be implemented in embodiments as described with regards to the 5G network environment for credential management of FIG. 3.

The embodiments of FIGS. 4A and 4B illustrate processes for device authentication at a local site. Caching security keys at a local site can be configured as a part of an initial authentication message exchange between a site authentication function (e.g., performed by one of UDMs 308a or 308b and/or alternatively by one of 5GC+UPFs 312a and 312b) of a local site, and the cloud authentication component of the 5GaaS component 314 (may also be referred to as a cloud configuration component such as central UDM 318). Accordingly, the local authentication function may perform management of the credential of a plurality of devices (e.g., one or more of UEs 302a and 302b) while the devices are present in the coverage area of a respective one of local sites 306a and 306b. Accordingly, the local authentication function can perform a periodic check with the cloud authentication component to confirm the device credentials that are currently stored locally at the local site to ensure up-to-date credentials for such devices are stored at the local site(s). An example authentication process 400, as described below with reference to FIGS. 4A-4C, provides the advantage of eliminating the need for replicating the credential database of the 5GaaS component 314, as shown in FIG. 3, in potentially hundreds of sites and requiring lifecycle management of all these replicated credential databases.

Referring to step 402 as illustrated in FIG. 4A, UE 401 (which can be the same as any one of UEs 302a and 302b of FIG. 3) may be onboarded. In one example, such onboarding may be performed as follows via central cloud UDM 407 (which can be the same as central UDM 316 of FIG. 3). For example, the central cloud UDM 407 may have relevant configuration parameter for UE 401 such as authorization for global access, site-specific access to specific sites (e.g., for period of time that is established by a time to live (TTL) parameter), relevant security and/or QoS policies for UE 401, etc.

At step 404, the UE 401 can send a registration request to the AMF/AUSF 403 for connecting to a local site (e.g., one of local sites 306a and 306b). The AMF/AUSF 403, in step 406 may submit an authentication request to the site UDM 405 (which can be the same as any one of UDMs 308a and 308b of FIG. 3). UDM 405 can determine that relevant credentials for authenticating UE 401 is not available in local cache (e.g., local cache 310a or 310b). In order to obtain the credentials, the site UDM 405 can requests the credentials from the UDM central cloud 407 over a secure channel.

Accordingly, in step 408, the site UDM 405 can submit a request to the central cloud UDM 407 to refresh the credentials associated with the UE 401 request to register to the site. The central UDM 407 is configured to check if the UE 401 is authorized to access the site, and if permitted, sends the device credentials including authentication keys and an associated TTL parameter, to the site UDM 405, as shown in step 410 (or alternatively responds with an indication that the UE 401 is not authenticated). The device credentials are stored in the UDM cache of the site, where the UDM 405 authenticates the UE 401, and stores the registration status.

At step 412, if the authentication is successful, the UDM 405 notifies the site AMF/AUSF 403 of successful authentication (or alternatively of unsuccessful authentication of UE 401).

At step 414, the AMF/AUSF 403 further responds to the UE's 401 registration request with a successful authentication notification (or alternatively of unsuccessful authentication of UE 401).

In some examples, as illustrated in FIGS. 4B and 4C, there can be a loss of connectivity between the site UDM 405 and the UE 401 to various reasons. This loss of connectivity may require the UE 401 to resubmit a registration request to obtain authorization to access a site (e.g., one of local sites 306a or 306b). FIG. 4B provides an example of the UE 401 resubmitting a registration request and being authenticated using locally stored credentials at the site UDM 405.

Referring to step 416 as illustrated in FIG. 4B, the UE 401 can attempt to reconnect to the network (e.g., after disconnecting from local site 306a or 306b and/or loss of connectivity to said local site) after a loss of connectivity between 5GC of local site 306a or 306b and 5GaaS component 314. At this step, UE 401 can submit a registration request to the AMF/AUSF 403. Subsequently, in step 418, the AMF/AUSF 403 can transmit an authentication request to the site UDM 405, where the site UDM 405 is configured to locally authenticate the UE 401 using the credentials that were previously stored in the UDM cache of the site such as one of site UDMs 308a and 308b (obtained from central UDM 316 in 5GaaS cloud 314 prior to the loss of connectivity).

In step 420, due to the ability to locally authenticate the UE 401, the site UDM 405 responds to the site AMF/AUSF 403 with an indication that the UE 401 is successfully authenticated (or alternatively with an indication that the UE 401 is not authenticated). In step 422, the site AMF/AUSF 403 is may respond to the UE's 401 registration request with a successful authentication (or unsuccessful authentication) notification.

FIG. 4C provides another example, where the UE 401 resubmits a registration request due to a loss of connectivity (e.g., after disconnecting from local site 306a or 306b and/or loss of connectivity to said local site 306a and 306b) but is unable to be authenticated by locally stored credentials at the site UDM 405. Referring to step 424, the UE 401 can attempt to reconnect to local site 306a or 306b and may submit a registration request to the site AMF/AUSF 403. Subsequently, in step 426, the site AMF/AUSF 403 transmits an authentication request to the site UDM 405, where the site UDM 405 determines that credentials pertaining to the device's registration to the site are expired/no longer stored in the UDM cache of the local site 306a and 306b. The expiration or unavailability of the credential for UE 401 may be due to any number of reasons including, but not limited to, expiration of the TTL parameter associated with credentials of UE 401 (as provided by UDM 407 per step 402 described above). In step 428, the site UDM 405 sends a request to the central cloud UDM 407 to refresh the credentials for the UE 401 as it pertains to the site. In step 430, the central cloud UDM 407 refreshes the credentials, including the TTL parameter, and sends them to the site UDM 405 to authenticate the UE 401. In step 432, upon successful authentication (or alternatively unsuccessful authentication), the site UDM 405 notifies the AMF/AUSF 403 of successful authentication (or alternatively unsuccessful authentication), based on the refreshed credentials received from the central cloud UDM 407. In step 434, the AMF/AUSF 403 notifies the UE 401 of the successful authentication (or alternatively unsuccessful authentication), permitting the UE 401 to reconnect to the network at the local site 306a and 306b if authenticated.

Accordingly, using techniques and processes described with reference to FIGS. 4A-4C, UEs requesting connectivity to any local site of a multi-site 5G network, may be locally authenticated. Using these techniques, the need for replicating the credential database of the 5GaaS Operator Cloud 314 in potentially hundreds of sites and requiring lifecycle management of all these replicated credential databases can be eliminated. Furthermore, a loss of connectivity between any local site 306a and 306b and the cloud may no longer impact the authentication of a UE for connecting to a local site 306a and 306b.

Figure 5:
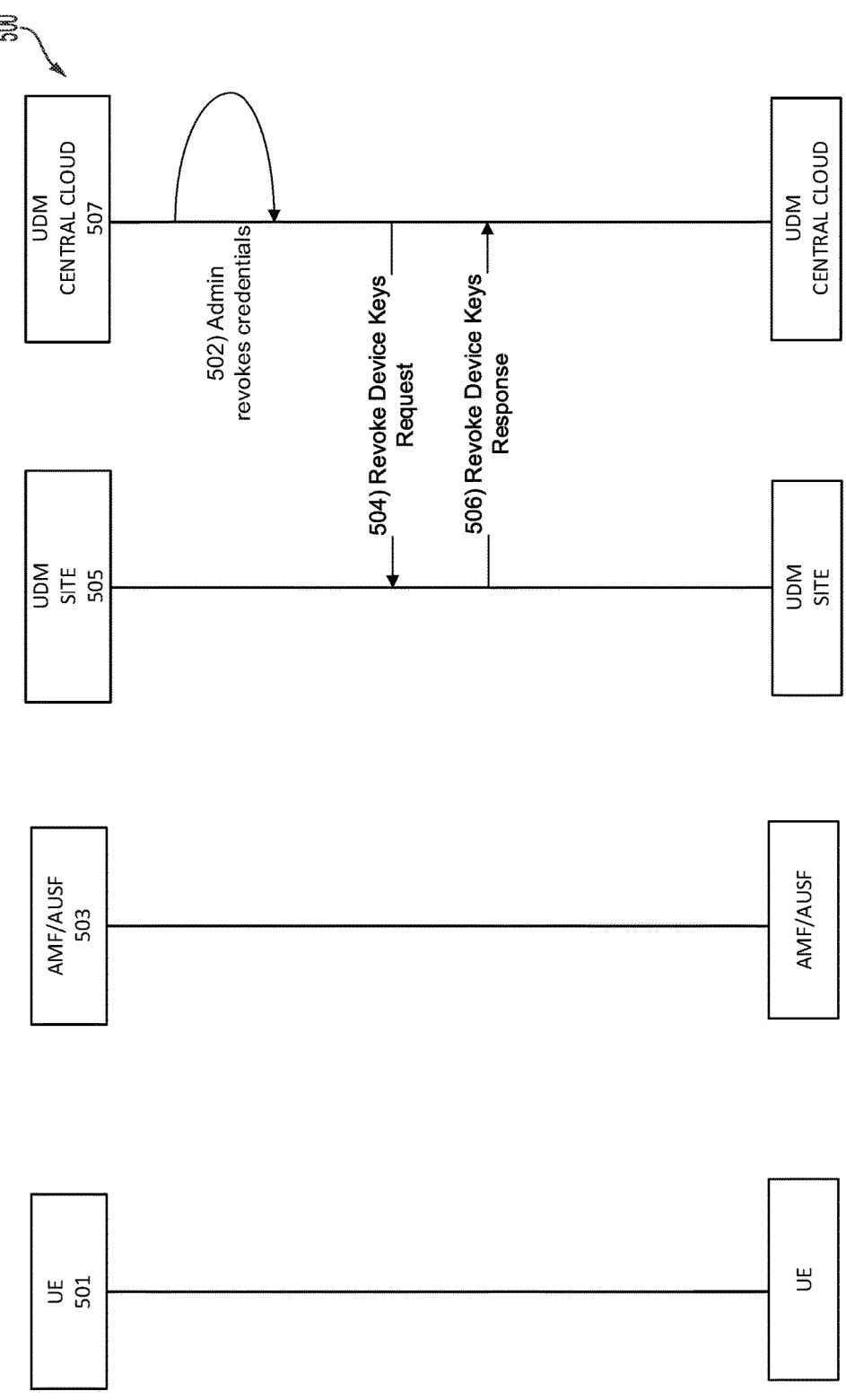
FIG. 5 illustrates an example communication diagram for revoking device credentials, according to some aspects of the present disclosure.

FIG. 5 illustrates an example communication diagram for revoking device credentials, according to some aspects of the present disclosure. In some examples, an administrator of the cloud authentication function may revoke the credentials of a device from the site. Accordingly, the cloud authentication function (performed by central UDM 316) can be used to notify the site authentication function to revoke the credentials for the device (e.g., UE 410) that is stored in the UDM cache 310a and 310b of the local site 306a and 306b. Referring to step 502, the administrator of the central cloud UDM 507 can revoke the credentials of the UE 502 due to expiration or a loss of access to a particular local site 306a and 306b. In step 504, the central cloud UDM 507 requests the site UDM 505 to remove the device keys currently stored in the UDM cache 310a and 310b of the local site 306a and 306b. In step 506, the site UDM 505 deletes the stored credentials for the device as requested by the central cloud UDM 507 and responds to the central cloud UDM 507 that the device credentials have been revoked.

Figure 6:
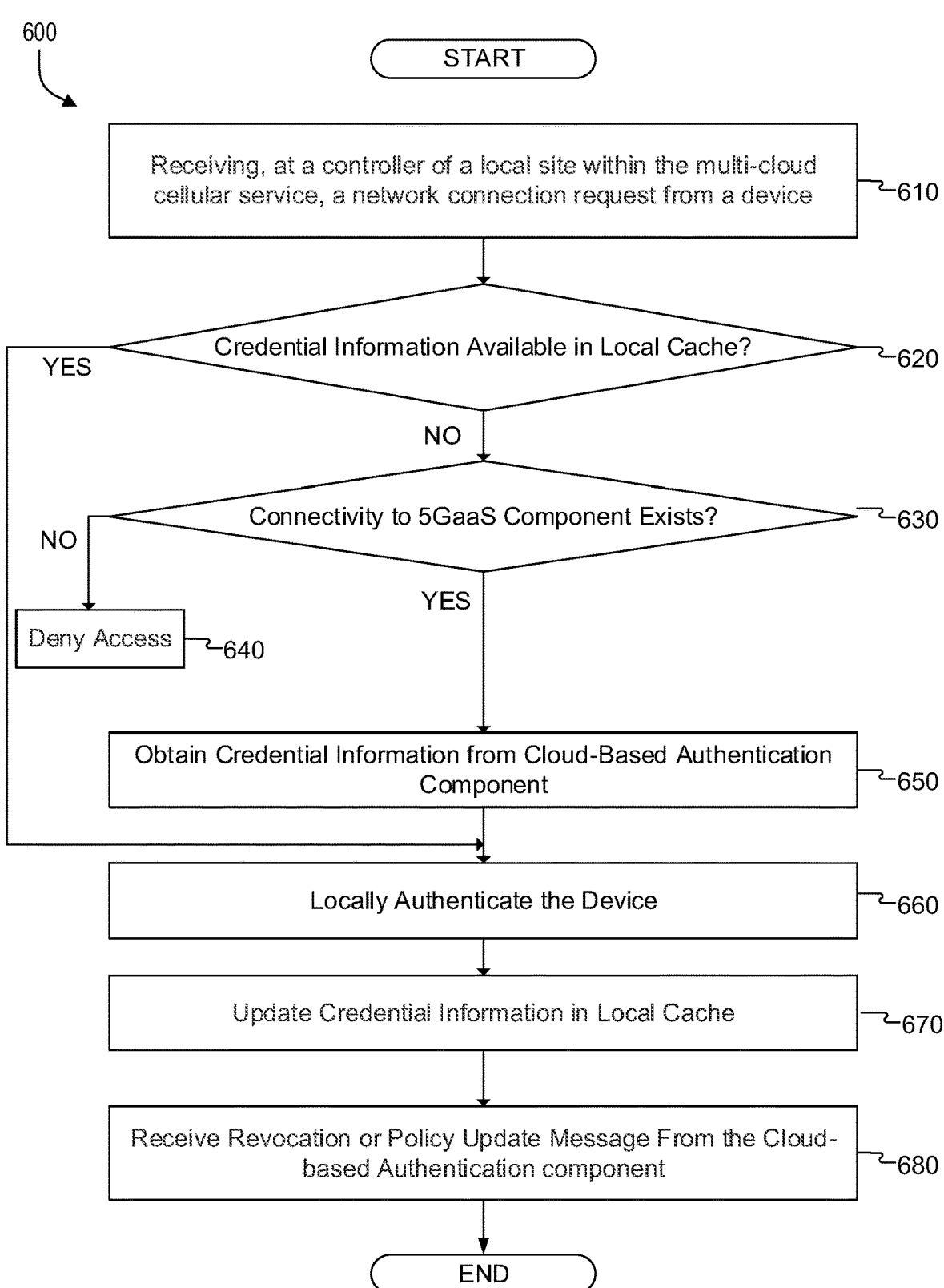
FIG. 6 illustrates a flowchart for an authentication method in a multi-cloud cellular service, according to some aspects of the present disclosure.

FIG. 6 illustrates a flowchart for an authentication method in a multi-cloud cellular service, according to some aspects of the present disclosure. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

In describing FIG. 6 and various steps thereof, references may be made to one or more of FIGS. 3 and 4A-4C. Furthermore, FIG. 6 will be described from the perspective of a controller at a local site, which can be the site UDM 308a or 5GC+UPF 312a of local site 306a or site UDM 308b 5GC+UPF 312b of local site 306b.

At step 610, a controller at a local site (e.g., one of local sites 306a or 306b) may receive a network connection request from a device (e.g., UE 401 which can be the same as any one of UEs 302a and 302b). The network connection request can be the same as registration request received at step 404 of FIG. 4A. In one example, the local site receiving the connection request (e.g., one of local sites 306a or 306b) does not have connectivity to a cloud-based authentication component (e.g., central UDM 316 of 5GaaS component 314) for authenticating the device. As noted, central 316 may be configured to store device credentials and network policies for authenticating devices connecting to the multi-cloud cellular service (e.g., system 300) across all sites associated with the multi-cloud cellular service. In one example, the cloud-based authentication component may perform a cite policy check to determine relevance of the credential information to the local site prior to sending the credential information to be stored at the local site.

In one example, the controller may have received the credential information for authenticating the device (e.g., one of UEs 302a and 302b) from the cloud-based authentication component (e.g., cloud UDM 316) prior to losing connectivity to the 5GaaS component 314.

At step 620, the controller may check the corresponding local cache (e.g., one of credential caches 310a or 310b) to determine if credential information for authenticating and onboarding the device is available. Credential information may not be available in the local cache or may be available but have an associated Time To Live (TTL) value that is expired.

If the credential information is not available or expired, at step 630, the controller may determine if the corresponding local site has connectivity to the 5GaaS component 314. If the controller determines that there is no connectivity, then at step 640, the controller may deny the device connectivity to the network and may transmit a message (e.g., connection denied) to the device.

However, if there is connectivity, at step 650, the controller may request updated credential information for the device that requested the connection at step 610, from central UDM 316.

Referring back to step 620, if the controller determines that the local cache has valid credential information for authenticating the device to connect the local site, then at step 660, the controller locally authenticates the device using stored credential information (obtained from the cloud-based authentication component prior to losing connectivity to the cloud-based authentication component). For example, the local site 306a and 306b illustrated in FIG. 3 may determine that the stored credential information has a corresponding Time To Live (TTL) value, which when expires, cannot be used to locally authenticate the device. The stored credential information can be a subset of the device credentials and network policies stored at the cloud-based authentication component that are relevant to the local site.

In one example, the controller may reject the connection request by the device if the TTL value of the credential information is expired.

Thereafter, at step 670, the controller may (periodically or upon a triggering condition) update a local cache in which the credential information is stored when security or policy updates are made at the cloud-based authentication component while the local site has connectivity to the cloud-based authentication component. For example, the local site illustrated in FIG. 3 may update a local cache in which the credential information is stored when security or policy updates are made at the cloud-based authentication component while the local site has connectivity to the cloud-based authentication component. More specifically, a local cache at the local site can be refreshed with updated credential information for the device upon re-establishing connectivity to the cloud-based authentication component, as illustrated in FIG. 4A in steps 408 and 410.

At step 680, the controller may receive a revocation message from the cloud-based authentication component when credentials of the device are removed (deleted, revoked, replaced, etc.) at the cloud-based authentication component. In another example, instead or in conjunction with the revocation message, the controller may receive a message from the cloud-based authentication component that may include updates to network policies associated with the device, security policies associated with the network device, QoS policies associated with the network device, updates to device's credential information, etc.

In one example, steps 660 and 670 may be optional and thus may not necessarily be carried out every time a device's authentication request for connecting to a local site is granted or denied.

Figure 7:
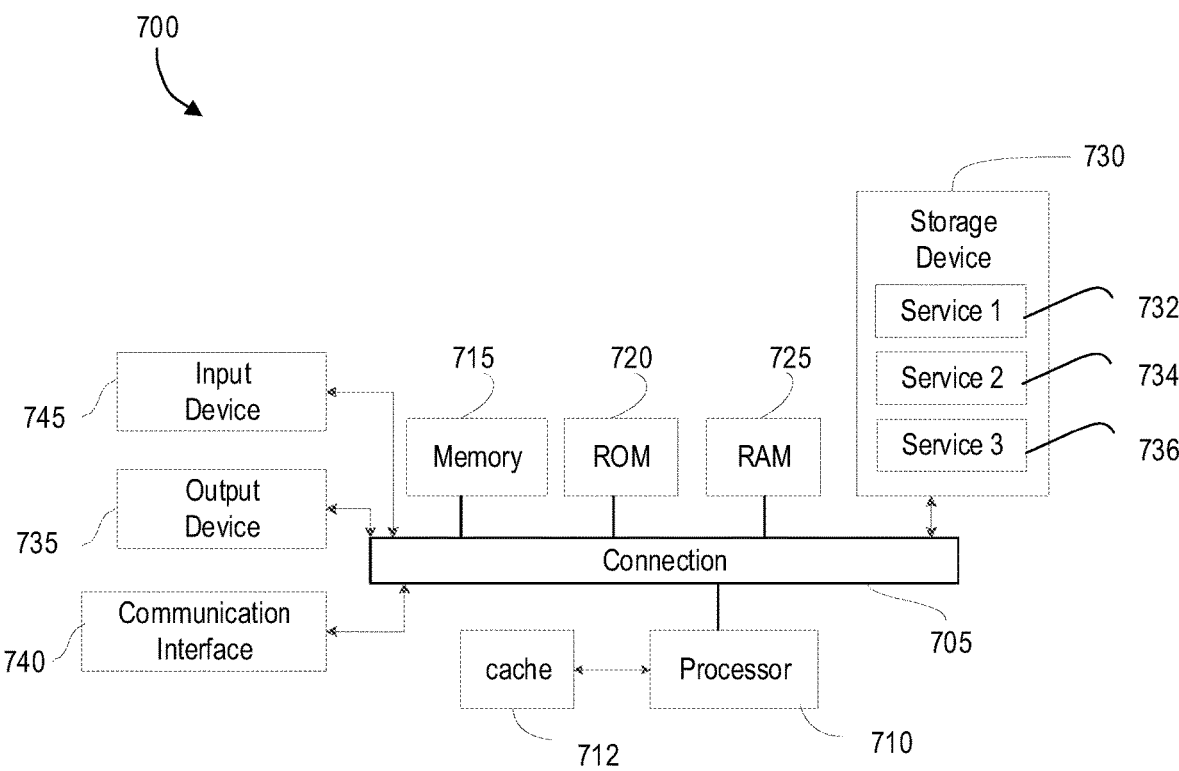
FIG. 7 shows an example of computing system, according to some aspects of the present disclosure.
Figure 8:
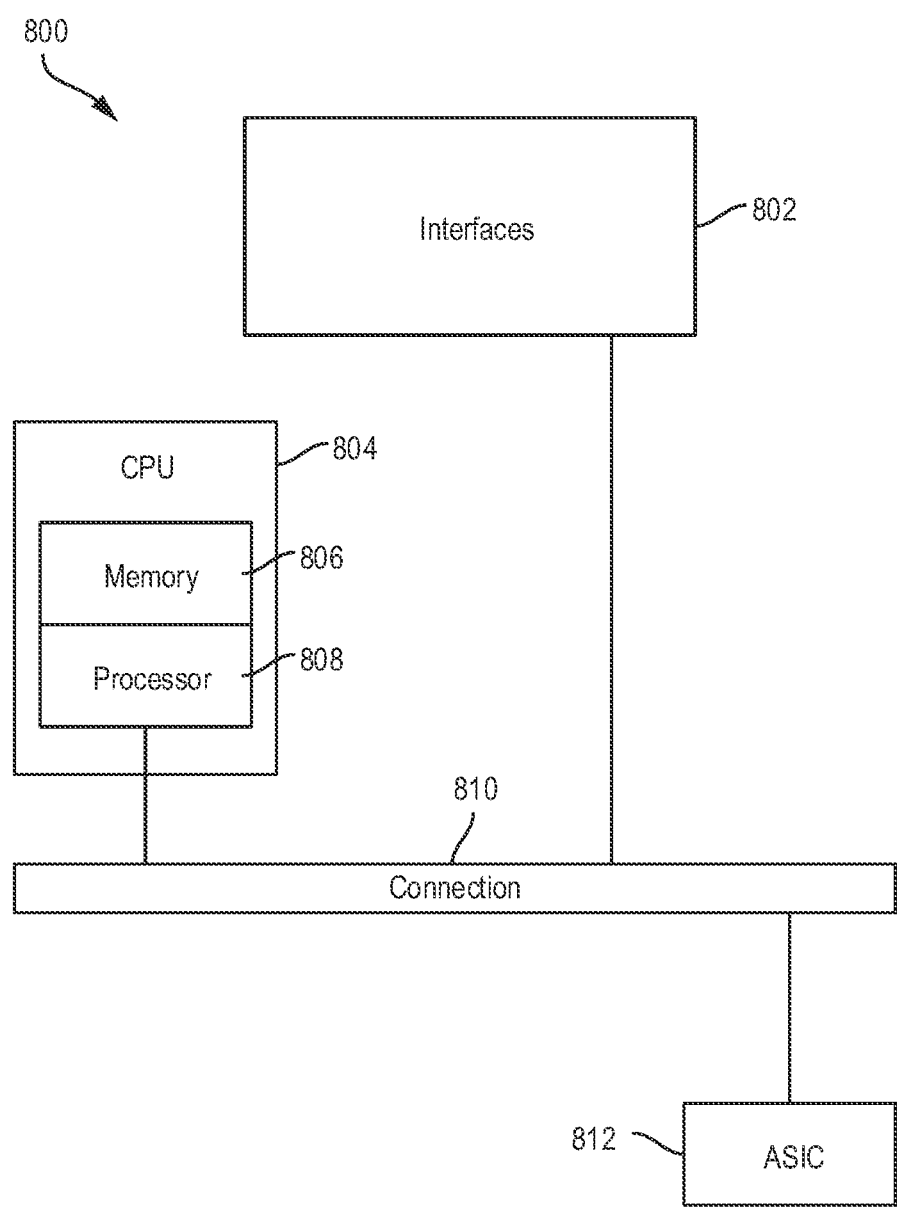
FIG. 8 illustrates an example network device, according to some aspects of the present disclosure.

The following disclosure with respect to FIGS. 7 and 8 illustrates example network devices and computing devices, such as switches, routers, load balancers, client devices, and so forth. Such example network and computing devices may be used to implement various components described above with reference to FIGS. 1-6 including, but not limited to, the local sites 306a and 306b, the 5GaaS component 314, the gNB 304a and 304b, illustrated in FIG. 3, and the AMF/AUSF 403 illustrated in FIGS. 4A-4C and FIG. 5.

FIG. 7 illustrates an example computing system, according to some aspects of the present disclosure. Computing system 700 can include components in electrical communication with each other using a connection 705 upon which one or more aspects of the present disclosure can be implemented. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

FIG. 8 illustrates an example network device, according to some aspects of the present disclosure. Network device 800 can be suitable for performing switching, routing, load balancing, and other networking operations, according to some aspects of the present disclosure. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. An authentication method in a multi-cloud cellular service, the method comprising: receiving, at a controller of a local site within the multi-cloud cellular service, a network connection request from a device, wherein the local site does not have connectivity to a cloud-based authentication component for authenticating the device, the cloud-based authentication component being a central network component configured to store device credentials and network policies for authenticating devices connecting to the multi-cloud cellular service across all sites associated with the multi-cloud cellular service; and locally authenticating, by the controller, the device using stored credential information obtained from the cloud-based authentication component prior to losing the connectivity to the cloud-based authentication component.

Aspect 2. The authentication method of Aspect 1, wherein the stored credential information has a corresponding Time To Live (TTL) value, which when expires, can not be used to locally authenticate the device.

Aspect 3. The authentication method of any of Aspects 1 to 2, wherein locally authenticating the device comprises: rejecting the device if the TTL vale of the credential information is expired.

Aspect 4. The authentication method of any of Aspects 1 to 3, further comprising: refreshing a local cache at the local site with updated credential information for the device upon re-establishing connectivity to the cloud-based authentication component.

Aspect 5. The authentication method of any of Aspects 1 to 4, wherein the stored credential information is a subset of the device credentials and network policies stored at the cloud-based authentication component that are relevant to the local site.

Aspect 6. The authentication method of any of Aspects 1 to 5, further comprising: receiving the credential information from the cloud-based authentication component prior to losing connectivity to the cloud-based authentication component.

Aspect 7. The authentication method of any of Aspects 1 to 6, wherein the cloud-based authentication component performs a cite policy check to determine relevance of the credential information to the local site prior to sending the credential information to be stored at the local site.

Aspect 8. The authentication method of any of Aspects 1 to 7, further comprising: updating a local cache in which the credential information is stored when security or policy updates are made at the cloud-based authentication component while the local site has connectivity to the cloud-based authentication component.

Aspect 9. The authentication method of any of Aspects 1 to 8, further comprising: receiving a revocation message from the cloud-based authentication component when credentials of the device are removed from the cloud-based authentication component.

Aspect 10. The authentication method of any of Aspects 1 to 9, further comprising:

What is claimed is:

1. An authentication method in a multi-cloud cellular network, the method comprising:
   receiving, at a local core network controller of a local site within the multi-cloud cellular network, a network connection request from a device, wherein the local site does not have connectivity to a cloud-based authentication component for authenticating the device, the cloud-based authentication component being a central network component configured to store device credentials and network policies for authenticating devices connecting to the multi-cloud cellular network across all sites associated with the multi-cloud cellular network, each local site of the multi-cloud cellular network hosting a local instance of one or more core network functions for providing cellular connectivity to devices connecting to the multi-cloud cellular network; and
   locally authenticating, by the local core network controller and using a Unified Data Manager Function at the local site, the device using stored credential information obtained from the cloud-based authentication component prior to losing the connectivity to the cloud-based authentication component.

2. The authentication method of claim 1, wherein the stored credential information has a corresponding Time To Live (TTL) value, which when expires, can not be used to locally authenticate the device.

3. The authentication method of claim 2, wherein locally authenticating the device comprises:
   rejecting the device if the corresponding TTL value of the credential information is expired.

4. The authentication method of claim 3, further comprising:

refreshing a local cache at the local site with updated credential information for the device upon re-establishing connectivity to the cloud-based authentication component.

5. The authentication method of claim 1, wherein the stored credential information is a subset of the device credentials and network policies stored at the cloud-based authentication component that are relevant to the local site.

6. The authentication method of claim 1, further comprising:

receiving the credential information from the cloud-based authentication component prior to losing connectivity to the cloud-based authentication component.

7. The authentication method of claim 6, wherein the cloud-based authentication component performs a cite policy check to determine relevance of the credential information to the local site prior to sending the credential information to be stored at the local site.

8. The authentication method of claim 1, further comprising:

updating a local cache in which the credential information is stored when security or policy updates are made at the cloud-based authentication component while the local site has connectivity to the cloud-based authentication component.

9. A controller of a local site within a multi-cloud cellular network configured to authenticate devices for connecting to the multi-cloud cellular network, the controller comprising:

one or more memories having computer-readable instructions; and one or more processors configured to execute the computer-readable instructions to:

receive a network connection request from a device, wherein the local site does not have connectivity to a cloud-based authentication component for authenticating the device, the cloud-based authentication component being a central network component configured to store device credentials and network policies for authenticating devices connecting to the multi-cloud cellular network across all sites associated with the multi-cloud cellular network, each local site of the multi-cloud cellular network hosting a local instance of one or more core network functions for providing cellular connectivity to devices connecting to the multi-cloud cellular network; and locally authenticate, using a Unified Data Manager Function at the local site, the device using stored credential information obtained from the cloud-based authentication component prior to losing the connectivity to the cloud-based authentication component.

10. The controller of claim 9, wherein the stored credential information has a corresponding Time To Live (TTL) value, which when expires, cannot be used to locally authenticate the device.

11. The controller of claim 10, wherein the controller is configured to locally authenticate the device by rejecting the device if the corresponding TTL value of the credential information is expired.

12. The controller of claim 9, wherein the one or more processors are configured to execute the computer-readable instructions to refresh a local cache at the local site with updated credential information for the device upon re-establishing connectivity to the cloud-based authentication component.

13. The controller of claim 9, wherein the stored credential information is a subset of the device credentials and network policies stored at the cloud-based authentication component that are relevant to the local site.

14. The controller of claim 9, wherein the one or more processors are configured to execute the computer-readable instructions to receive the credential information from the cloud-based authentication component prior to losing connectivity to the cloud-based authentication component.

15. The controller of claim 9, wherein the cloud-based authentication component performs a cite policy check to determine relevance of the credential information to the local site prior to sending the credential information to be stored at the local site.

16. The controller of claim 9, wherein the one or more processors are configured to execute the computer-readable instructions to update a local cache in which the credential information is stored when security or policy updates are made at the cloud-based authentication component while the local site has connectivity to the cloud-based authentication component.

17. One or more non-transitory computer-readable media comprising computer-readable instructions, which when executed by one or more processors at a controller of a local site within a multi-cloud cellular network, causes the controller to:

receive a network connection request from a device, wherein the local site does not have connectivity to a cloud-based authentication component for authenticating the device, the cloud-based authentication component being a central network component configured to store device credentials and network policies for authenticating devices connecting to the multi-cloud cellular network across all sites associated with the multi-cloud cellular network, each local site of the multi-cloud cellular network hosting a local instance of one or more core network functions for providing cellular connectivity to devices connecting to the multi-cloud cellular network; and locally authenticate, using a Unified Data Manager Function at the local site, the device using stored credential information obtained from the cloud-based authentication component prior to losing the connectivity to the cloud-based authentication component.

18. The one or more non-transitory computer-readable media of claim 17, wherein the stored credential information has a corresponding Time To Live (TTL) value, which when expires, can not be used to locally authenticate the device.

19. The one or more non-transitory computer-readable media of claim 18, wherein the execution of the computer-readable instructions further cause the controller to locally authenticating the device by rejecting the device if the corresponding TTL value of the credential information is expired.

20. The one or more non-transitory computer-readable media of claim 17, wherein the stored credential information is a subset of the device credentials and network policies stored at the cloud-based authentication component that are relevant to the local site.

* * * * *